United States Patent [19]
Asai et al.

[11] Patent Number: 6,166,713
[45] Date of Patent: Dec. 26, 2000

[54] ACTIVE MATRIX DISPLAY DEVICE

[75] Inventors: Yoshihiro Asai; Hiroyuki Kimura, both of Tokyo, Japan

[73] Assignee: Kabushiki Kaisha Toshiba, Kawasaki, Japan

[21] Appl. No.: 09/104,005

[22] Filed: Jun. 24, 1998

[30]     Foreign Application Priority Data

Jun. 25, 1997  [JP]  Japan .................................. 9-168952
Mar. 20, 1998  [JP]  Japan ................................. 10-072580

[51] Int. Cl.⁷ ...................................................... G09G 3/36
[52] U.S. Cl. ............................................... 345/92; 345/98
[58] Field of Search .............................. 345/98, 100, 90, 345/91, 92, 93

[56]         References Cited

U.S. PATENT DOCUMENTS

| | | | |
|---|---|---|---|
| 5,434,599 | 7/1995 | Hirai et al. | 345/100 |
| 5,579,029 | 11/1996 | Arai et al. | 345/132 |
| 5,619,221 | 4/1997 | Hirai et al. | 345/58 |
| 5,646,643 | 7/1997 | Hirai et al. | 345/100 |
| 5,712,652 | 1/1998 | Sato et al. | 345/90 |
| 5,900,856 | 5/1999 | Iino et al. | 345/100 |
| 6,005,543 | 12/1999 | Kimura | 345/94 |

FOREIGN PATENT DOCUMENTS 9-90428   4/1997   Japan .

*Primary Examiner*—Vijay Shankar
*Assistant Examiner*—Vanel Frenel
*Attorney, Agent, or Firm*—Oblon, Spivak, McClelland, Maier & Neustadt, P.C.

[57]               ABSTRACT

An active matrix display device including an array substrate that has a signal lines and scanning lines that cross each other, switching elements, and pixel electrodes that are provided in the vicinity of the respective crossing points. The pixel electrodes are connected to the lines via respective switching elements. A scanning signal supply provides a scanning signal that has a first voltage that turns on the switching elements and a second voltage that turns off the switching elements. A first connector electrically connects the scanning lines to each other. A driving circuit having nonlinear resistor elements sets the voltage of the first connector to be substantially equal to the second voltage.

18 Claims, 9 Drawing Sheets

161,171a,171b

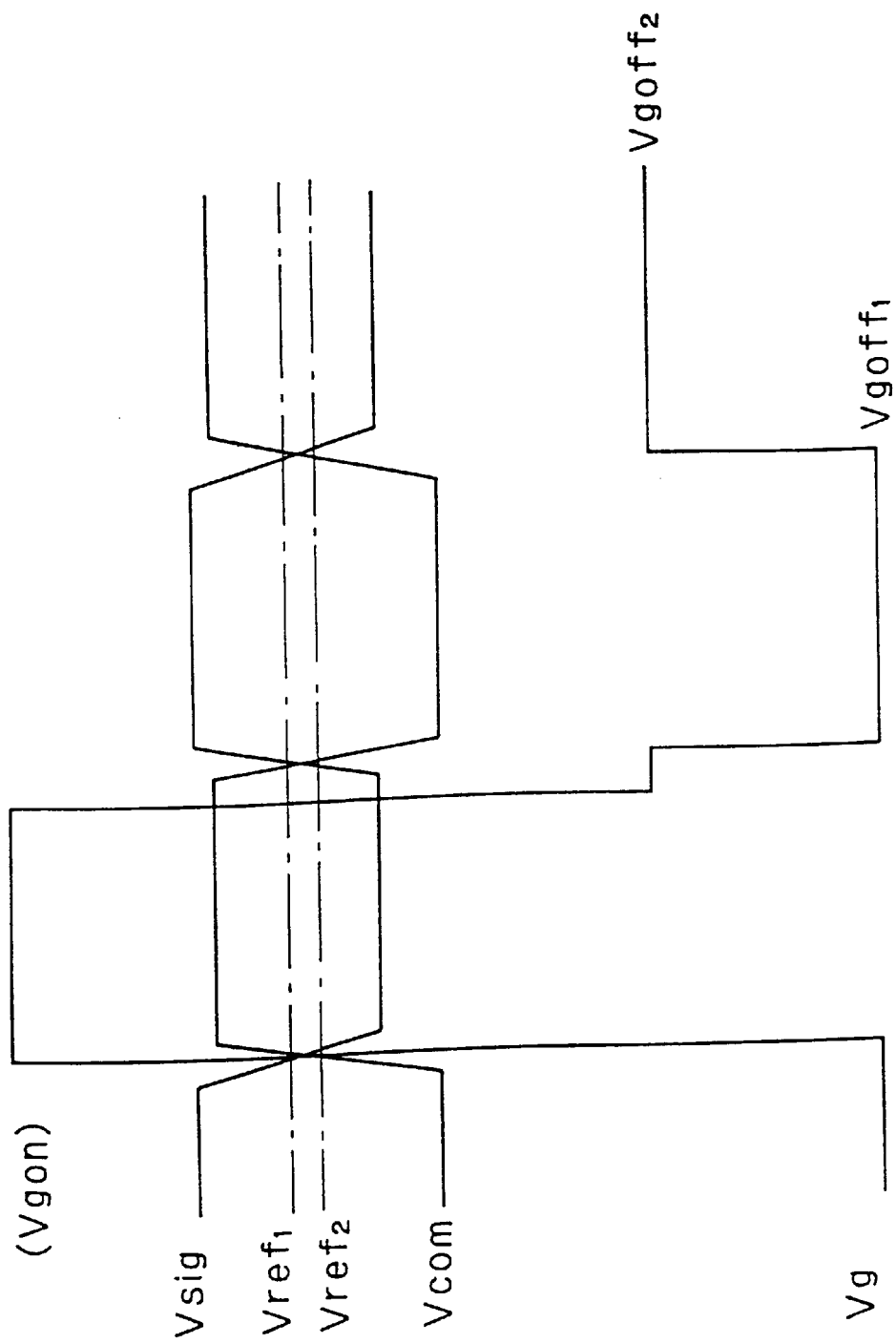

ACTIVE MATRIX DISPLAY DEVICE

BACKGROUND OF THE INVENTION

1. Field of the Invention

The present invention relates to a display device including matrix wiring and, more particularly, to an active matrix display device for preventing static electricity.

2. Description of the Related Art

Flat-panel display devices, especially liquid crystal display devices, have come to be used in various fields because they are thin, light, and of low power consumption. Among those display devices, active matrix liquid crystal display devices in which switching elements are provided for respective display pixels are used in fields where high-resolution display images are particularly required, because crosstalk between adjacent pixels can be minimized.

For example, an active matrix liquid crystal display device is constructed in such a manner that a twisted nematic (TN) liquid crystal component is held between an array substrate and a counter substrate via alignment films.

In the array substrate, a plurality of signal lines and a plurality of scanning lines are arranged in matrix form with an insulating film interposed therebetween, and active elements such as thin-film transistors (TFTs) serving as switching elements are arranged in the vicinity of the respective crossing points of the signal lines and the scanning lines. Pixel electrodes are connected to the lines via the active elements. The counter substrate has a counter electrode that confronts the pixel electrodes.

Usually, an insulating substrate made of glass, quartz, or the like is used as the array substrate. However, because the substrate is made of insulator, the insulating substrate is influenced by static electricity that is generated during manufacture. That is, static electricity causes a high voltage to be applied to crossing points of signal lines and scanning lines, possibly causing an insulation failure. This results in such problems as short-circuiting between a signal line and a scanning line and a device failure of a thin-film transistor.

To solve the above problems, a technique is known which prevents local application of a high voltage by distributing charge that is accumulated on the signal lines and the scanning lines by connecting those lines to a common conductor wiring (short ring). However, since the short ring needs to be removed at the final manufacturing step, this technique cannot reduce the rate of occurrence of manufacturing failures due to static electricity that occur after the final step.

In view of the above, as disclosed in, for instance, JP-A-63220289 (Japanese Unexamined Patent Publication No. Sho 63-220289), another technique has been developed in which rather than the signal lines and the scanning lines are connected to the short ring directly, they are connected to the short ring via switching elements. For example, the switching elements establish an electrical path between the signal lines/scanning lines and the short ring only when a voltage difference that is larger than a voltage difference corresponding to ordinary operation voltages is generated. This technique can greatly decrease manufacturing failures due to static electricity because it is not necessary to remove the short ring.

However, concentrated studies of the present inventors revealed that the above technique increases current consumption.

Incidentally, a liquid crystal display device has been proposed which can reduce voltage drops in the signal lines and which enables the output impedance of an external driving circuit for applying voltages to the signal lines to be set at a higher value than in conventional cases (JP-A-09090428 (Japanese Unexamined Patent Publication No. Hei. 9-90428)).

In this liquid crystal display device, electrostatic breakdown protective elements are connected between the scanning lines and a protective element line and between the signal lines and a protective element line. Further, the protective element lines are connected to a common line to which a common voltage is applied via resistor elements. The resistor element is formed by making the line width of a portion of a wiring line smaller than that of the other portions by etching and also making the film thickness smaller there. With this configuration, currents flowing into the scanning lines from the common line via the electrostatic breakdown protective elements are reduced by the resistor elements, whereby the common voltage can be prevented from decreasing.

However, even this type of liquid crystal display device has the following problems.

First, since wiring line portions serve as the resistor elements, they are prone to influences of line disconnection or the like.

Second, to provide a sufficiently large resistance, it is necessary to make wiring line portions sufficiently thin and long. Since the formation of such wiring line portions are subject to exposure-related limitations and are influenced by various kinds of variations, it is difficult to form resistor elements in a stable manner. Further, long wiring line portions are subject to limitations on the positions of their formation.

An object of the present invention is therefore to provide an active matrix display device which can prevent the production yield from decreasing due to the influence of static electricity as well as can lower the power consumption.

SUMMARY OF THE INVENTION

The present invention provides an active matrix display device comprising an array substrate having a plurality of signal lines, a plurality of scanning lines crossing the signal lines, switching elements disposed in the vicinity of respective crossing points of the signal and scanning lines, and pixel electrodes connected with the respective switching elements, a counter electrode opposed to the pixel electrodes, a light modulating layer held between the counter electrode and the pixel electrodes, a signal line driver supplying a video signal voltage to the signal lines, a scanning line driver supplying a scanning signal to the scanning lines, the scanning signal having a first voltage for turning on the switching elements and the second voltage for turning off the switching elements, a counter electrode driver for supplying the counter electrode voltage to the counter electrode, a scanning line connector electrically connected with the counter electrode driver and electrically connecting the scanning lines to each other, first nonlinear elements electrically interposed between the scanning line connector and each of the scanning lines respectively, and a first nonlinear resistor circuit adjusting the counter electrode voltage to a third voltage which is substantially equal to the second voltage.

According to another aspect of the invention, there is provided an active matrix display device comprising an array substrate having a plurality of signal lines, a plurality of scanning lines crossing the signal lines, switching elements disposed in the vicinity of respective crossing points of the signal and scanning lines, and pixel electrodes connected with the respective switching elements, a counter electrode opposed to the pixel electrodes, a light modulating layer held between the counter electrode and the pixel electrodes, a signal line driver supplying a video signal voltage to the signal lines, a scanning line driver supplying a scanning signal to the scanning lines, the scanning signal having a first voltage for turning on the switching elements and the second voltage for turning off the switching elements, a counter electrode driver for supplying the counter electrode voltage to the counter electrode, a signal line connector electrically connected with the counter electrode driver and electrically connecting the signal lines to each other, first nonlinear elements electrically interposed between the signal line connector and each of the signal lines respectively, and a first nonlinear resistor circuit adjusting the counter electrode voltage to a third voltage which is substantially equal to an average voltage of the video signal voltage.

In the above active matrix display devices, because the nonlinear resistor circuit is provided, the potential of the scanning line connector can be set substantially equal to the second voltage or the potential of the signal line connector can be set substantially equal to the average voltage of the video signal voltage. Therefore, the flow of undesirable current can be prevented without increasing the power supply voltages, whereby the power consumption can be reduced.

BRIEF DESCRIPTION OF THE DRAWINGS

FIG. 6 shows waveforms of drive signals used in the first embodiment;

DETAILED DESCRIPTION OF THE PREFERRED EMBODIMENTS

Embodiment 1

A liquid crystal display device 1 according to a first embodiment of the present invention will be described with reference FIGS. 1–6.

Figure 1:
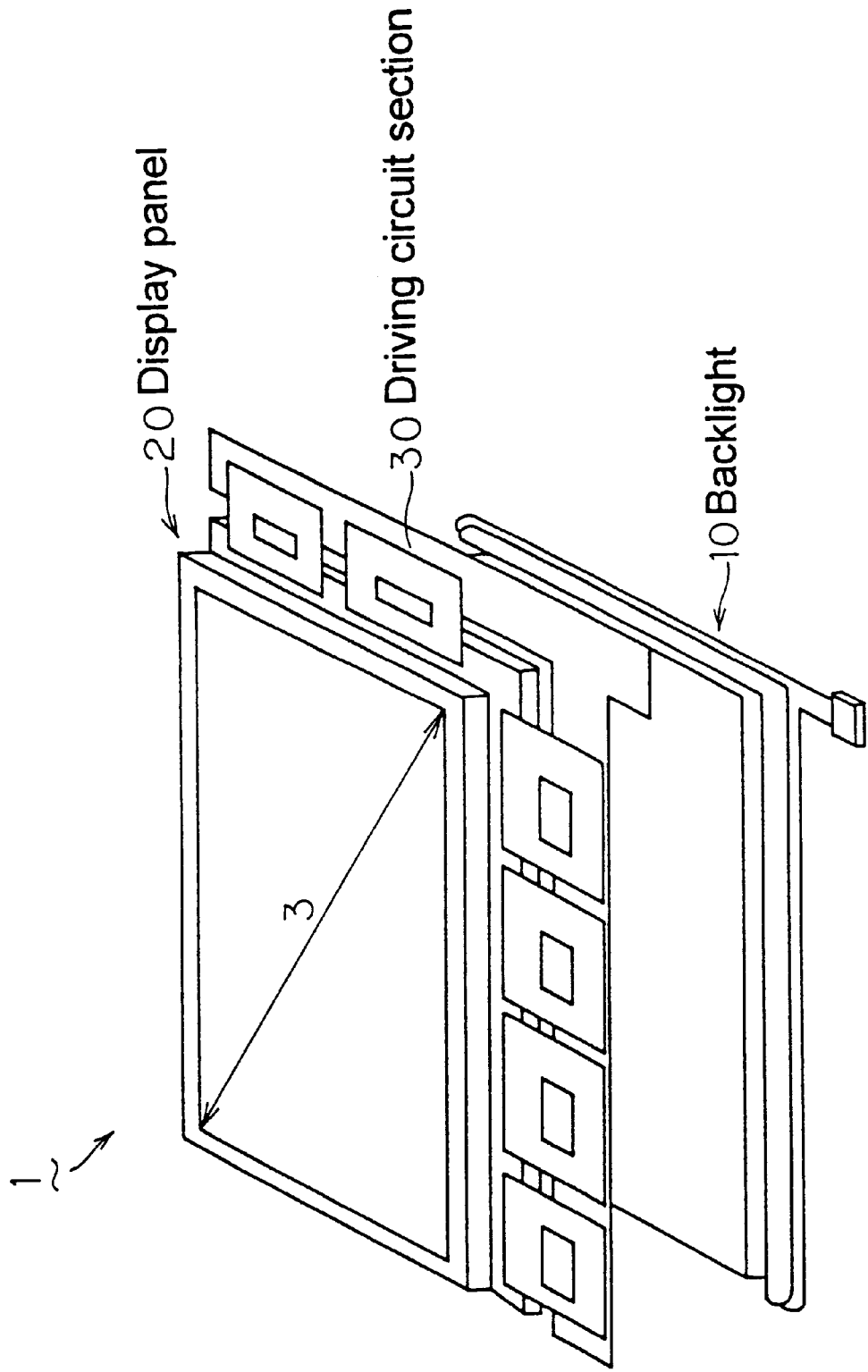
FIG. 1 is a schematic perspective view of a liquid crystal display device according to a first embodiment of the present invention.

As shown in FIG. 1, the liquid crystal display device 1 is a transmission-type, active matrix display device for a car navigation purpose having an effective display area 3 of 7 inches (diagonal), and includes a transmission-type display panel 20 that performs display by using light emitted from a backlight 10 as a light source. The display panel 20 is connected to a driving circuit section 30 for supplying video signals Vsig, scanning signals Vg, and a counter electrode voltage Vcom to signal lines, scanning lines, and a counter electrode/short ring (described later), respectively.

Figure 2:
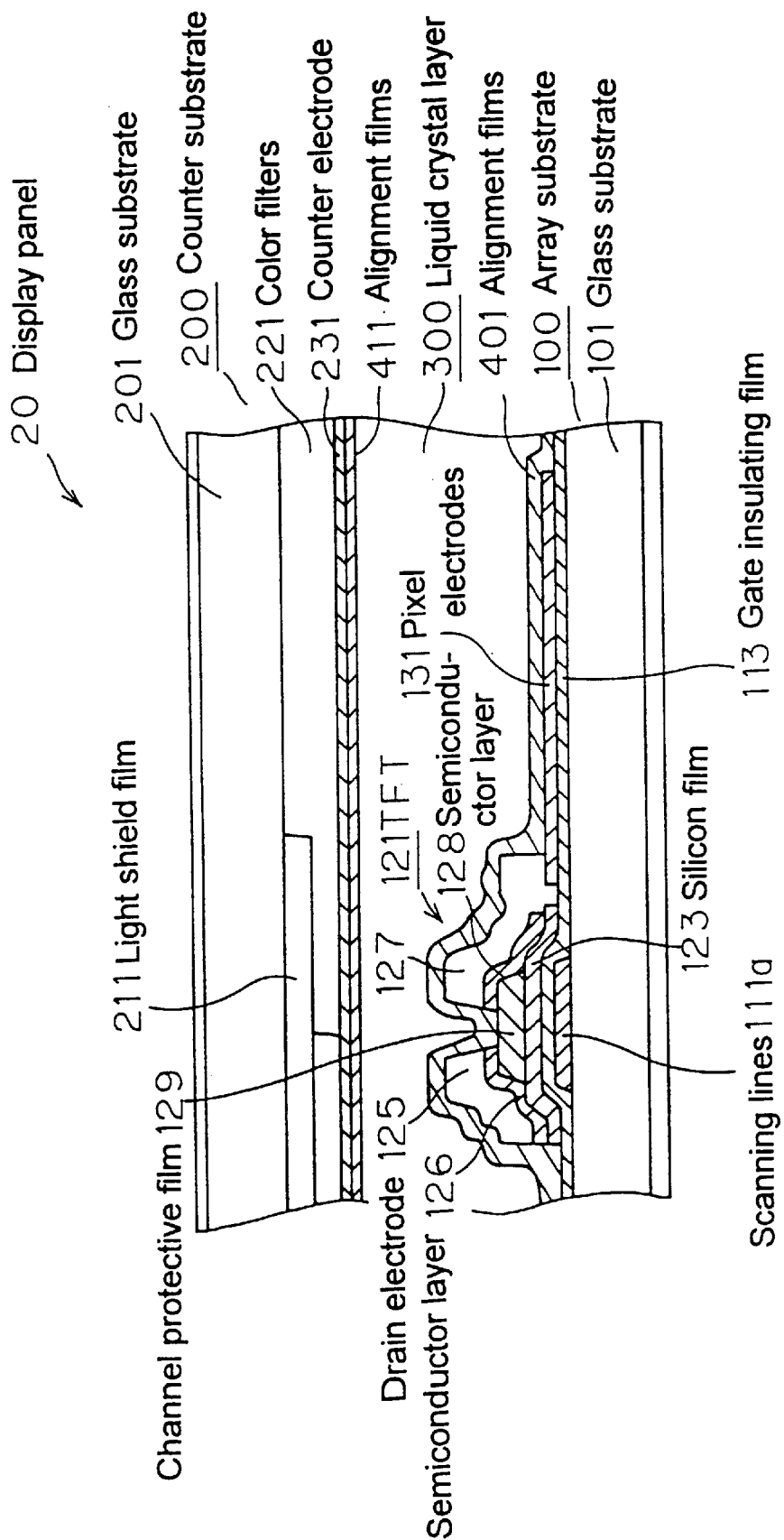
FIG. 2 is a schematic sectional view of part of a display panel.

As shown in FIG. 2, the display panel 20 includes an array substrate 100, a counter substrate 200, and a TN liquid crystal layer 300 of about 5 $\mu$m in thickness, which is provided between the array substrate 100 and the counter substrate 200 via alignment films 401 and 411.

Figure 3:
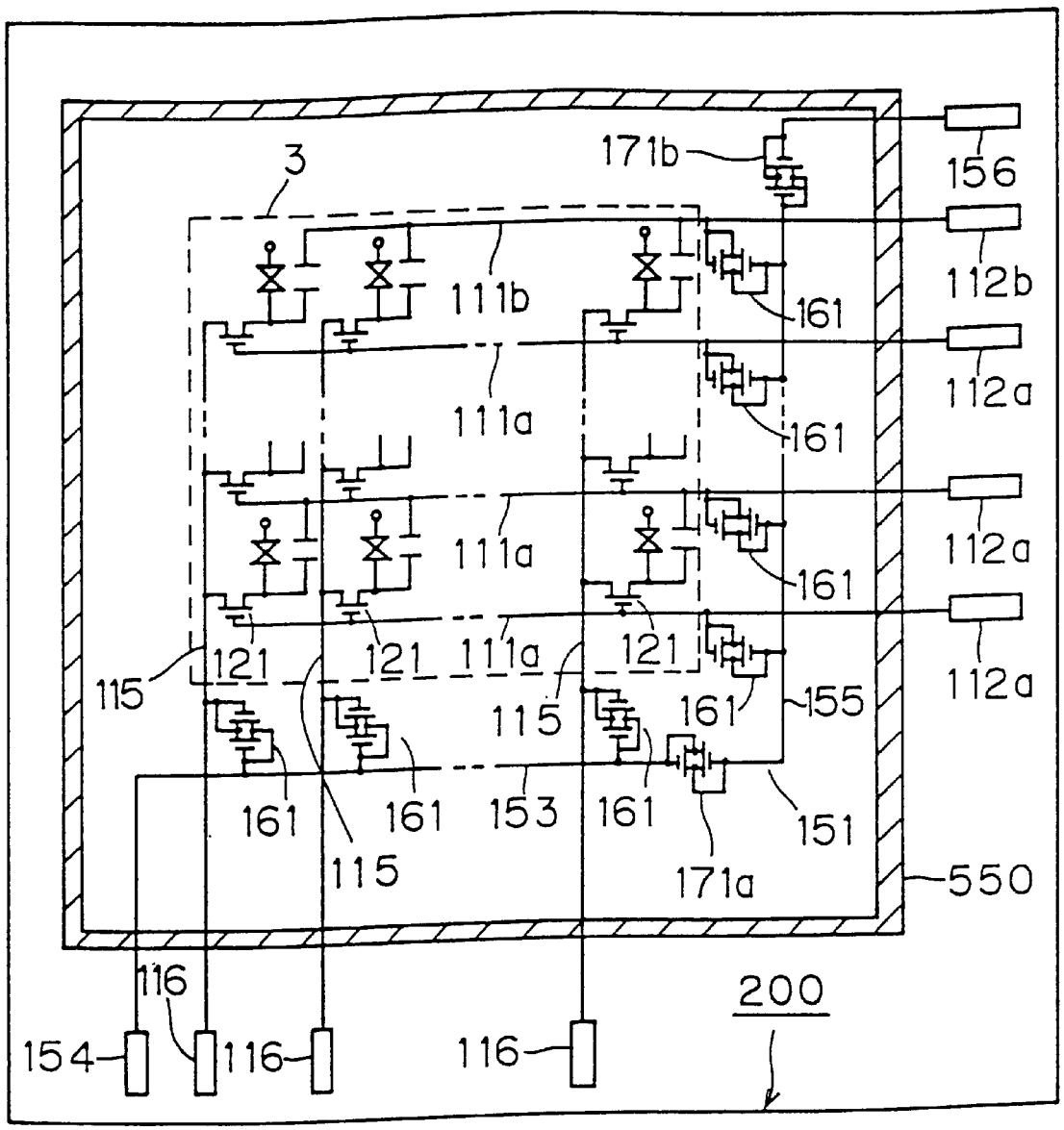
FIG. 3 is a schematic plan view (circuit diagram) of an array substrate that constitutes the display panel.
Figure 4:
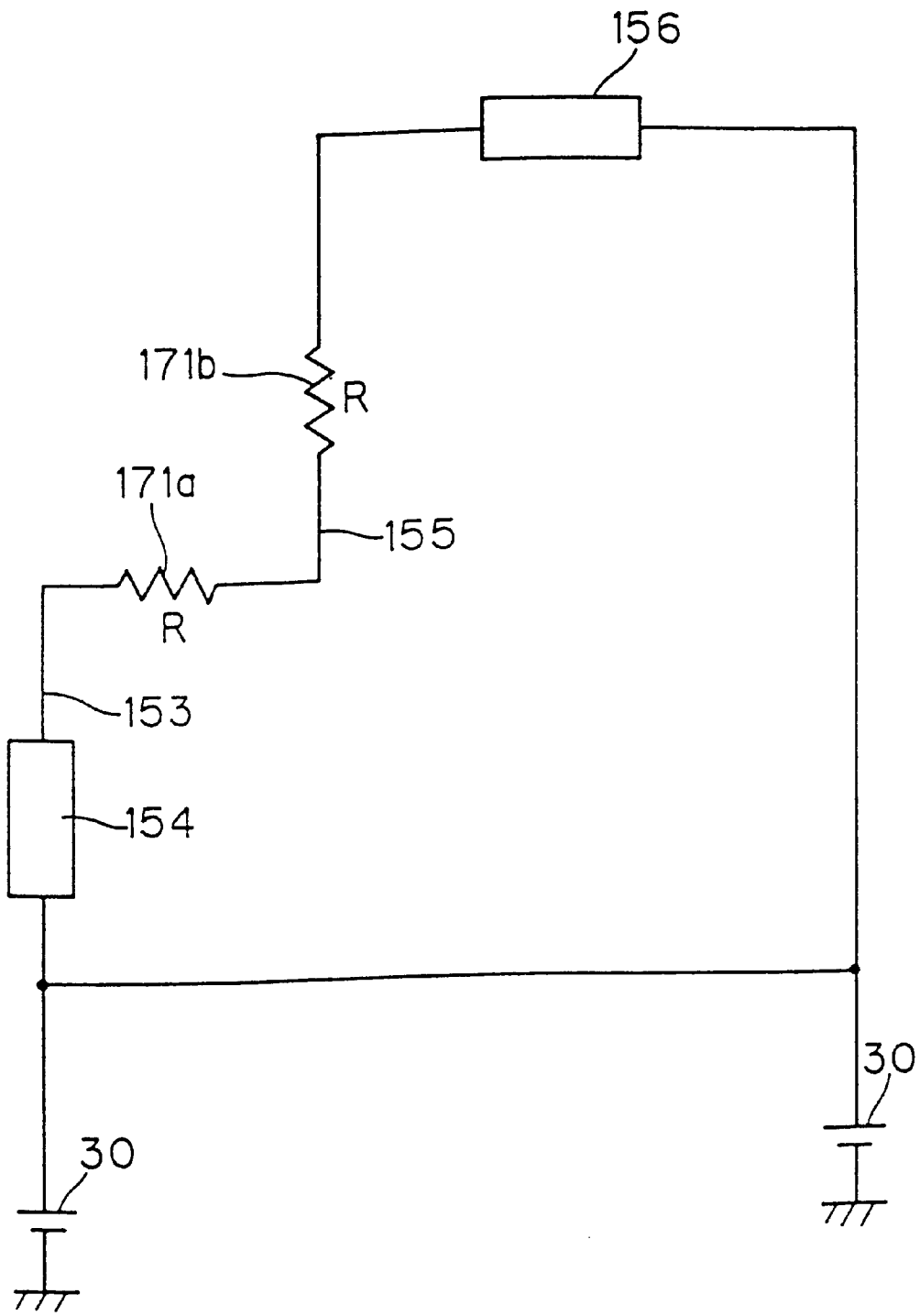
FIG. 4 is a circuit diagram for description of an operation of the first embodiment.

The display panel 20 will be described below in detail with reference to FIGS. 2 and 3. As will be explained below, nonlinear elements are formed on peripheral portion of the array substrate.

The array substrate 100 includes 240 scanning lines 111a and one dummy scanning line 111b that are provided on a glass substrate 101 and made of a molybdenum-tungsten (Mo-Ta) alloy, and 460×3 aluminum (Al) signal lines 115 that cross the scanning lines 111a via a silicon nitride ($SiN_x$) film that also serves as a gate insulating film 113 of TFTs 121 (described later). The inverted staggered structure TFTs 121 are provided in the vicinity of the respective crossing points of the scanning lines 111a and the signal lines 115. Each TFT 121 has the scanning line 111a and the signal line 115 themselves as a gate electrode and a drain electrode 125, respectively. The TFT 121 also has an amorphous silicon (a-Si) film 123 as an active layer, a channel protective film 129 for protecting the a-Si film 123, and low-resistivity semiconductor layers 126 and 128 made of a doped amorphous silicon ($n^+$a-Si) respectively provided between the drain electrode 125 and the a-Si film 123 and between a source electrode 127 and the a-Si film 123. The source electrodes 127 of the TFTs 121 are electrically connected to transparent electrodes made of ITO as pixel electrodes 131, respectively. In this embodiment, each pixel electrode 131 is laid over next scanning line 111a (that corresponds to the preceding scanning step) via the gate insulating film 113, whereby a storage capacitor Cs is formed between the pixel electrode 131 and the next scanning line 111a.

The counter substrate 200 includes a transparent electrode as a counter electrode 231 that is formed on a glass substrate 201. A light shield film 211, color filters 221, and other components are provided between the glass substrate 201 and the counter electrode 231.

The signal lines 115 and the scanning lines 111a and 111b are extended to the ends portions of the glass substrate 101 and connected to connection pads 116, 112a, and 112b, respectively, for electrical connection to external driving circuits.

The signal lines 115 and the scanning lines 111a and 111b are also connected to a short ring 151 that is provided immediately outside the effective display area 3. The short ring 151 includes a first segment 153 that crosses the signal lines 151 and a second segment 155 that crosses the scanning lines 111a and 111b. The first segment 153 is formed in the same process with the same material as the scanning lines 111a and 111b, and the second segment 155 is formed in the same process with the same material as the signal lines 115. The first segment 153 and the second segment 155 are connected to each other in the vicinity of their crossing point through a through-hole (not shown). Instead of forming the short ring 151 as a metal line as in the above-described case, it may be made of the same semiconductor layer as the TFTs 121 are made or some other material.

One end of the first segment 153 is extended outward and connected to a connection pad 154 for electrical connection to an external driving circuit, and similarly one end of the second segment 155 is extended outward and connected to a connection pad 156 for electrical connection to an external driving circuit.

Figure 5A:
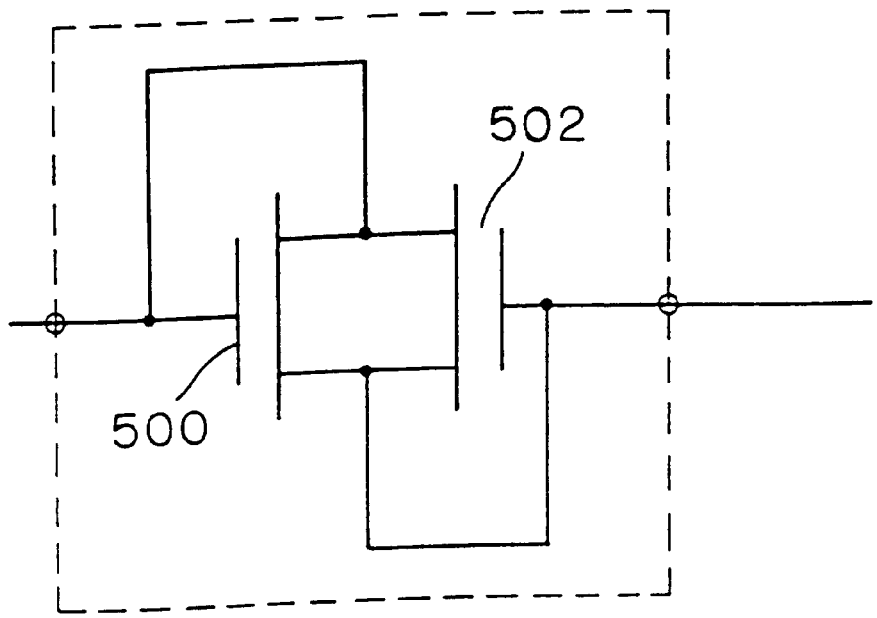
FIG. 5A is a circuit diagram of a protective circuit and a nonlinear resistor according to the first embodiment.

The signal lines 115 and the scanning lines 111a and 111b are connected to the corresponding segments 153 and 155 of the short ring 151 via protective circuits 161, respectively. As shown in FIG. 5A, each protective circuit 161 is configured in such a manner that two TFTs whose gate and source are short-circuited with each other are connected to each other in parallel. That is, the gate and the source of each of two TFTs 500 and 502 are connected to each other and the gate of each of the TFTs 500 and 502 is connected to the drain of the other. The protective circuit 161 is expressed by an equivalent circuit of FIG. 5B in which diodes 504 and 506 are connected in series back to back. The protective circuit 161 functions as a high-resistance resistor of $1.0 \times 10$ Ω when it is given a voltage difference on the level of ordinary operation. When a high voltage due to the influence of static electricity or the like is applied to the protective circuit 161, it establishes conduction between the short ring 151 and the corresponding signal line 115 or scanning line 111a or 111b to thereby prevent local application of a high voltage. The TFTs 500 and 502 constituting the protective circuits 161 can be formed in the same process as the TFTs 121 that are connected to the respective pixel electrodes 131. The resistance of each protective circuit 161 can be controlled by adjusting the number of TFTs, the channel length, and other factors.

This embodiment has a specific feature that nonlinear resistors 171a and 171b are inserted between the first segment 153 and the second segment 155 of the short ring 151.

Figure 5B:
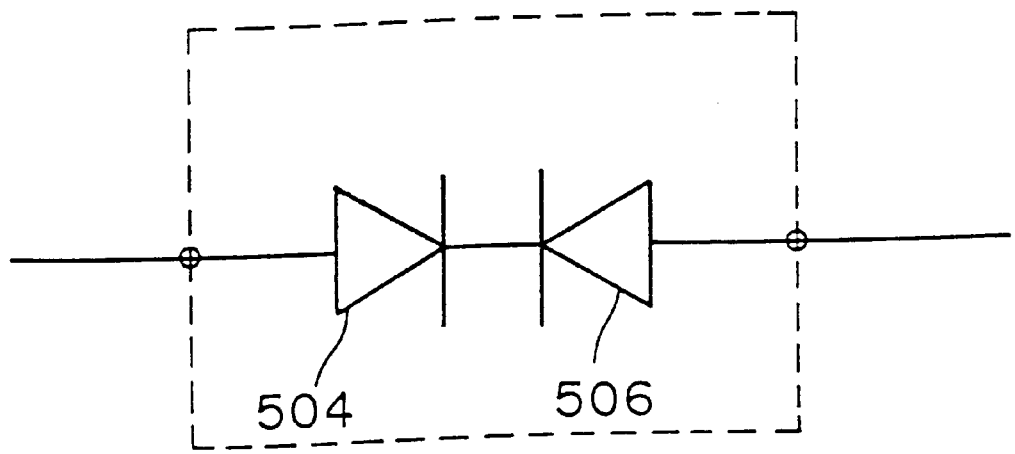
FIG. 5B is an equivalent circuit diagram of FIG. 5A.
Figure 7:
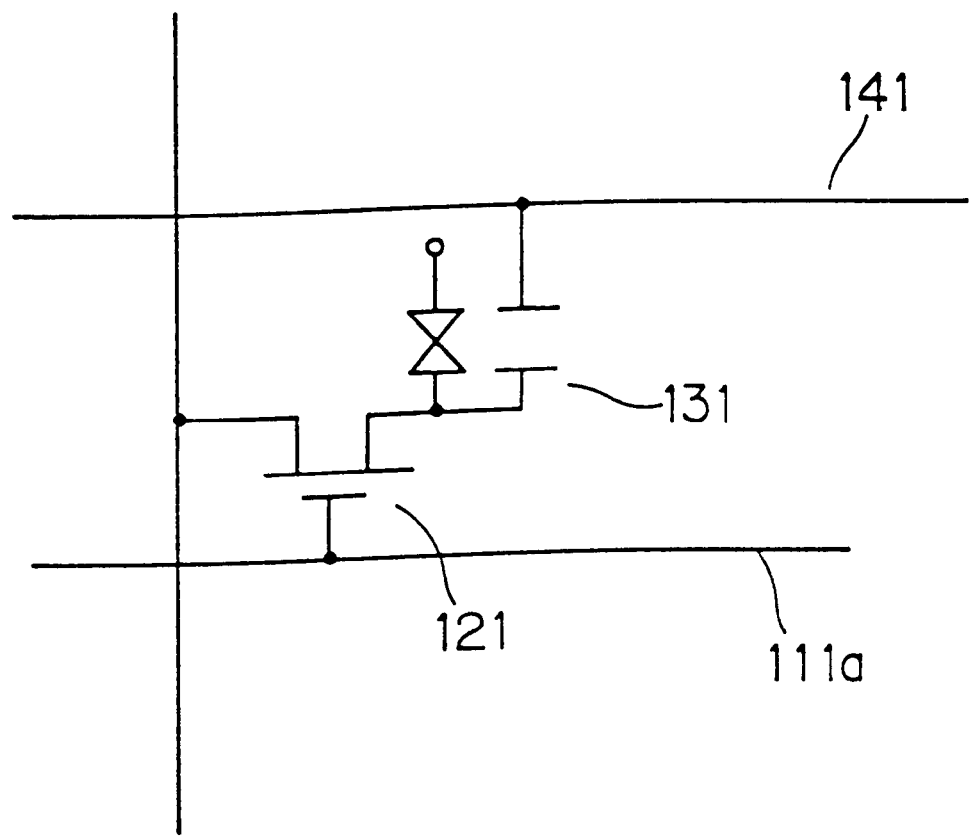
FIG. 7 is an equivalent circuit diagram of one display pixel of the array substrate according to a modification of the first embodiment.

Like the protective circuit 161, as shown in FIGS. 5A and 5B, each of the nonlinear resistors 171a and 171b is configured in such a manner that two TFTs whose gate and source are connected to each other are connected to each other in parallel. The TFTs of the nonlinear resistors 171a and 171b can be formed in the same process as the TFTs 121 that are connected to the respective pixel electrodes 131. The resistance of each nonlinear resistor 171a or 171b can be controlled by adjusting the number of TFTs, the channel length, and other factors. In this embodiment, settings are made so that each nonlinear resistor 171a or 171b functions as a high-resistance resistor of about $5 \times 10^6$ Ω when it is given a voltage difference on the level of ordinary operation.

The short ring 151 is electrically connected to an external circuit via the connection pads 154 and 156 after completion of the product. In this embodiment, the short ring is set at the same potential as a counter electrode voltage Vcom. The short ring 151 is located inside a sealing pattern 550. Only the connection pads 112a, 112b and 116 and the connection pads 154 and 156 are located outside the sealing pattern 550.

The scanning lines 111a and 111b, the signal lines 115, the counter electrode 231, and the short ring 151 are electrically connected to the driving circuit section 30 so as to receive the following signals. As shown in FIG. 6, the scanning lines 111a and 111b are supplied with a scanning signal Vg in which a first off level $Vgoff_1$ is −21 V, a second off level $Vgoff_2$ is −15 V, and an on level Vgon is 18 V. The signal lines 115 are supplied with a video signal Vsig that has an amplitude corresponding to a display gray scale level with respect to a reference voltage $Vref_1$ of 2.5 V (maximum amplitude: ±2.5 V) and is inverted in polarity every horizontal scanning period. The counter electrode 231 is supplied with a counter electrode voltage Vcom that has an amplitude of ±3.0 V with respect to a reference voltage $Vref_2$ of 1.5 V and is inverted in polarity every horizontal scanning period so as to have a phase opposite to that of the video signal Vsig. The same voltage as the counter electrode voltage Vcom is applied between the connection pads 154 and 156 of the short ring 151. The reason why the scanning signal Vg has the first and second off levels $Vgoff_1$ and $Vgoff_2$ is to prevent the pixel potentials from varying with a variation in the counter electrode voltage Vcom.

With the above configuration, a voltage that is effectively as small as about 1 V is applied between the first segment 153 of the short ring 151 and the respective signal lines 115. This average voltage of the video signal Vsig is approximately equal to a voltage applied between the first segment 153 of the short ring 151 though it depends on an image to be displayed.

Although there occurs no problem effectively if the average of the voltage applied to the first segment 153 falls within the maximum amplitude of the video signal Vsig, it is desirable that the average of the voltage applied to the first segment 153 be equal to the center voltage of the video signal Vsig (i.e., the reference voltage $Vref_1$).

If the nonlinear resistors 171a and 171b were not inserted in the short ring 151, a voltage of 19.5 V would always be applied between the second segment 155 of the short ring 151 and the scanning lines 111a and 111b except during one horizontal scanning (selection) period of each vertical scanning period.

In the invention, as described above, the nonlinear resistors 171a and 171b are inserted between the first segment 153 and the second segment 155 of the short ring 151. Therefore, because of the presence of the nonlinear resistors 171a and 171b, the voltage applied to the second segment 155 is reduced to about −21 V to −18 V, which is approximately equal to the first and second off levels $Vgoff_1$ and $Vgoff_2$ of the scanning signal Vg (see FIG. 4). As a result, the gate-source and gate-drain voltages of the TFTs 161 constituting the protective circuits 161 that are connected to the scanning lines 111a and 111b were reduced and hence the current consumption were sufficiently reduced. Although it is desirable that the voltage applied to the second segment 155 be made approximately equal to the first and second off levels $Vgoff_1$ and $Vgoff_2$ of the scanning signal Vg, the difference between these voltages may be set at about 0–5 V. Where the scanning signal Vg has a plurality of off levels Vgoff as in the case of compensating variations in the pixel potentials with the scanning signal Vg, it is desirable that the voltage applied to the second segment 155 be set equal to a voltage close to the average of the plurality of off levels Vgoff. But it may be set equal to one of the off levels Vgoff.

According to the invention, the current consumption was reduced by about 500 μA from the case of a liquid crystal display device that was configured in the same manner as in this embodiment except that the non-linear resistors 171a and 171b were not used.

Where the nonlinear resistors 171a and 171b are not used, the TFTs constituting each protective circuit 161 are always in an on state. Since the resistance varies at a high rate with respect to the temperature, the current consumption increases with a temperature increase of the display panel 20. For example, the temperature of the display panel 20 increased from 20° C. to 40° C., the current consumption increased by about 300 μA. In contrast, in the embodiment, the temperature dependence of the current consumption was eliminated almost completely.

With the above-described configuration in which the protective circuits 161 and the nonlinear resistors 171a and 171b are formed by the nonlinear element that is constituted of TFTs, it is not necessary to adjust the thickness and the length of wiring lines to adjust the resistance value as described in the background section; the resistance value can be controlled easily.

Although in this embodiment the storage capacitor Cs is formed by each pixel electrode 131 and the next scanning line 111a, it may be formed by providing a storage capacitor line 141 that is approximately parallel with the scanning line 111a and forming the pixel electrode 131 so as to overlap with the storage capacitor line 141 via an insulating film. In this case, since the scanning signal Vg has a single off level-Vgoff, in the above-described driving method it is effective to decrease the voltage applied to the second segment 155 to a certain voltage and to make an adjustment so that its average voltage becomes substantially equal to the off level Vgoff of the scanning signal Vg.

Embodiment 2

A second embodiment of the invention will be described below with reference to FIG. 8.

Figure 8:
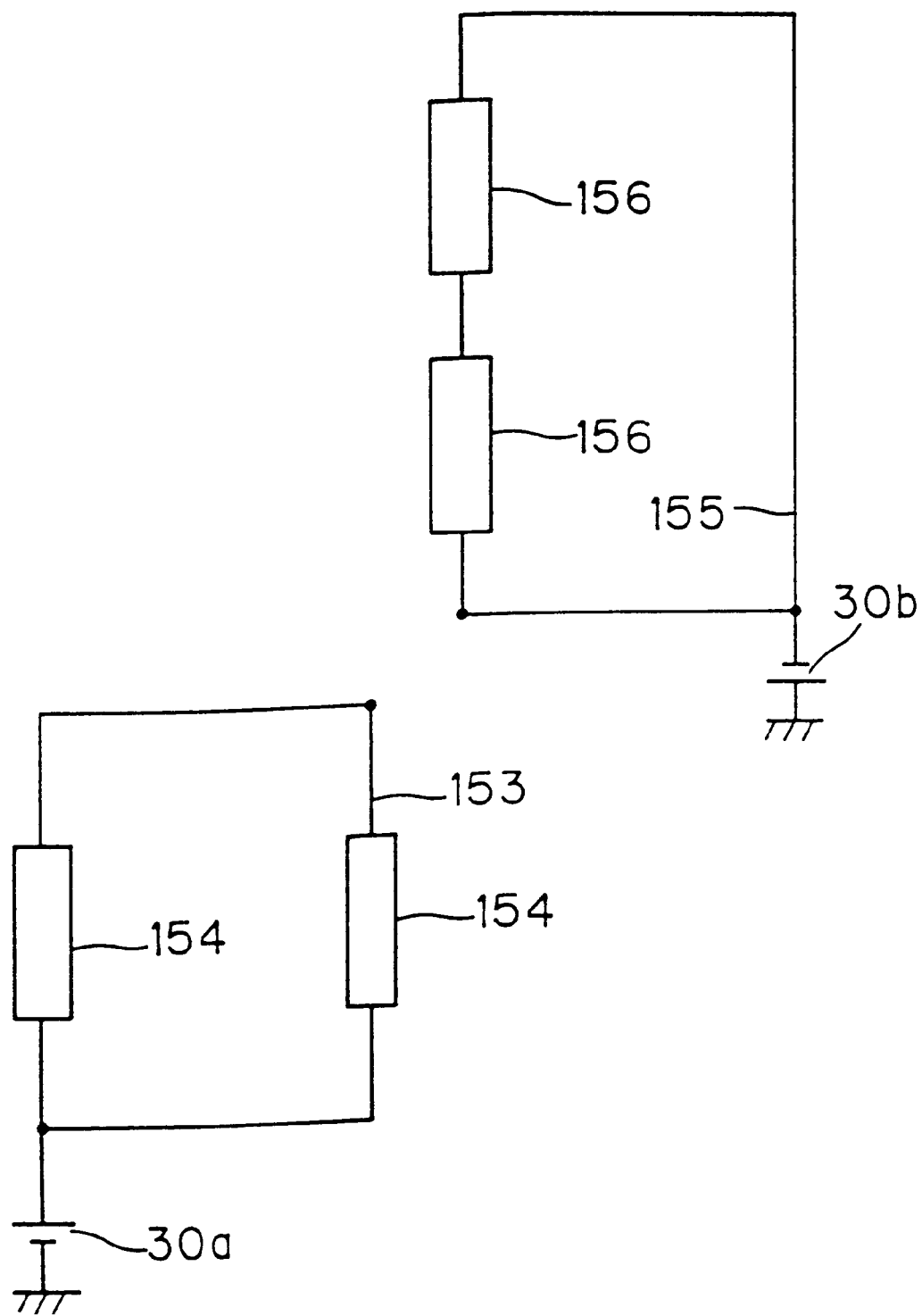
FIG. 8 is a circuit diagram for description of an operation of a second embodiment of the invention.

While in the first embodiment the voltages of the first and second segments 153 and 155 of the short ring 151 are controlled by inserting the nonlinear resistors 171a and 171b between the first and second segments 153 and 155, the first and second segments 153 and 155 may be provided independently of each other as shown in FIG. 8.

A voltage 30a close to the average of the voltages applied to the signal lines 115, for instance, the counter electrode voltage Vcom, may be applied to the first segment 153. A voltage 30b that is a voltage applied to the scanning line 111a and 111b, for instance, an off level Voff of the scanning signal Vg, may be supplied to the second segment 155.

Alternatively, a video signal Vsig that is applied to, for instance, an end signal line 115 may be supplied to the first segment 153. In this case, it is preferable to apply the voltage to the first segment 153 via a buffer to increase the power supply ability.

With the above configuration, the power consumption can be reduced by an amount equivalent to the amount in the first embodiment without the need for preparing any special power supply voltage. However, since the first and second segments are electrically independent of each other, the effect of preventing the influence of static electricity is somewhat weaker than in the first embodiment.

The voltages can further be adjusted finely by inserting the nonlinear resistors 171a and 171b in the first segment 153 or the second segment 155 as in the case of the first embodiment.

Embodiment 3

A third embodiment of the invention will be described below with reference to FIG. 9.

Figure 9:
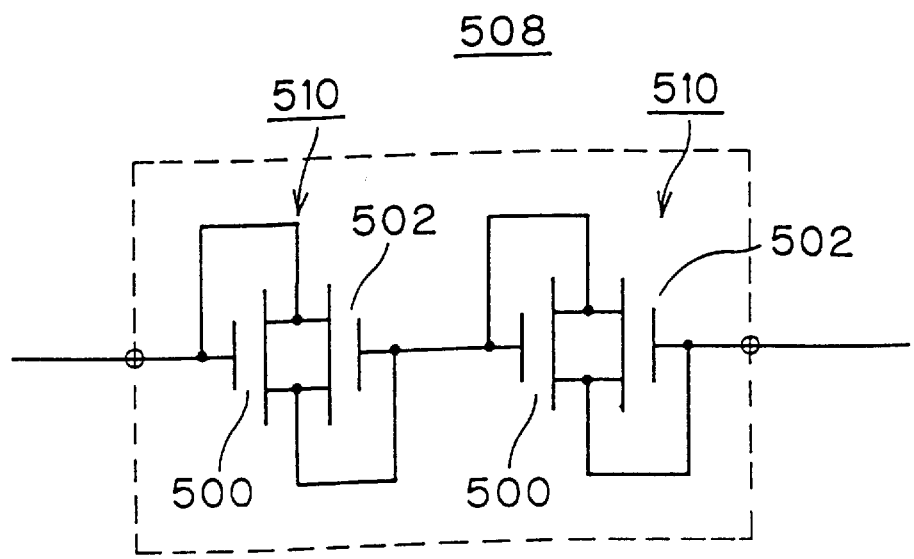
FIG. 9 is a circuit diagram showing a protective circuit and a nonlinear resistor according to a third embodiment of the invention.

The third embodiment is different from the first embodiment in that instead of the circuit of FIG. 5A a circuit 508 shown in FIG. 9 is used as each of the protective circuits 161 and the nonlinear resistors 171a and 171b.

In the circuit 508, two sets of TFTs each set being configured in such a manner that two TFTs whose gate and source are short-circuited with each other are connected to each other in parallel are connected to each other in series. Specifically, each nonlinear element 510 is formed by short-circuiting the gate and the source of each of two TFTs 500 and 502 with each other and connecting the gate of each of the two TFTs 500 and 502 to the drain of the other. The two nonlinear elements 510 are connected to each other in series so that the gates are connected to each other.

With the circuit 508, if short-circuiting occurs in a TFT of one nonlinear element 510, the other nonlinear element 510 can still provide a large resistance value.

Embodiment 4

A fourth embodiment of the invention will be described below with reference to FIG. 10.

Figure 10:
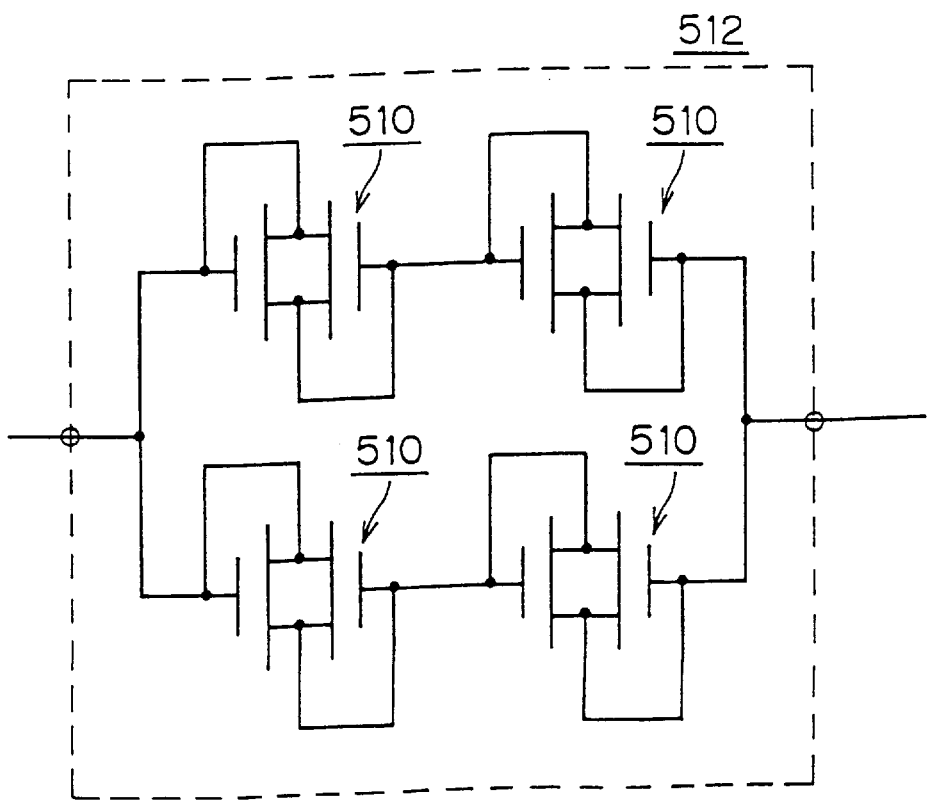
FIG. 10 is a circuit diagram showing a protective circuit and a nonlinear resistor according to a fourth embodiment of the invention.

In this embodiment, a circuit 512 shown in FIG. 10 is used instead of each of the protective circuits 161 and the nonlinear resistors 171a and 171b of the first embodiment.

The circuit 512 is a parallel connection of two circuits each of which is the same as the circuit 508 of the third embodiment. Specifically, two nonlinear elements 510 are connected to each other in series and the two series connections of the nonlinear elements 510 are connected to each other in parallel.

Even if short-circuiting occurs in one of the four nonlinear elements 510, the circuit 512 can still maintain a large resistance value. Further, even if one of the four nonlinear elements 510 is opened, the circuit 512 itself is not disconnected and can still maintain a large resistance value.

Although in the fourth embodiment the two circuits 508 are connected to each other in parallel, instead two nonlinear elements 510 may be connected to each other in parallel. Also in this case, a sufficiently large resistance value can be maintained even if one of the nonlinear elements 510 is opened.

Modifications

Although in the above embodiments the short ring 151 is provided on only one side of the scanning lines 111a and 111b and the signal lines 115, it may be provided on both sides of those lines. In the case of providing the short ring 151 on only one side of those lines, the short ring 151 may be provided on the side opposite to the side where the connection pads 112a, 112b, and 116 are provided.

In the TFTs 121, the TFTs constituting the protective circuits 161, and the TFTs constituting the nonlinear resistors 171a and 171b, the active layer need not always be made of a-Si film and it may be made of p-Si, microcrystalline silicon, or the like. Further, the TFTs may have a staggered structure.

The driving circuit 30 may be formed on the array substrate 100 in an integral manner.

In the above embodiments, the liquid crystal layer 300 is held between the array substrate 100 having the pixel electrodes 131 and the counter substrate 200 having the counter electrode 231 and confronting the array substrate 100. The invention can also be applied to a case where pixel electrodes and a counter substrate are provided on an array substrate and a liquid crystal layer is controlled by lateral electric fields developing between the pixel electrodes and the counter electrode.

Further, it goes without saying that various kinds of liquid crystals can be used instead of the above-mentioned TN liquid crystal.

What is claimed is:

1. An active matrix display device, comprising:

an array substrate containing pixel electrodes disposed, via switching elements, in the vicinity of respective crossing points of mutually crossing plural signal lines and plural scanning lines;

a counter electrode opposed to the pixel electrodes;

a display panel containing a light modulating layer controlled on the basis of a potential difference between the counter electrode and the pixel electrodes;

a video signal supply configured to apply a video signal voltage to the plural signal lines;

a scanning signal supply configured to supply a scanning signal having a first voltage configured to turn on the switching elements and a second voltage configured to turn off the switching elements to the plural scanning lines; and a counter electrode driver configured to supply a counter electrode voltage to the counter electrode;

wherein the array substrate includes, a scanning line connector which electrically connects the plural scanning lines mutually via a first nonlinear element and which is electrically connected to the counter electrode driver, and a first nonlinear resistance circuit configured to adjust the counter electrode voltage applied to the scanning line connector substantially to the second voltage;

wherein when a high voltage is applied to the plural scanning lines, the first nonlinear element is turned on and an electric charge on the plural scanning lines is thereby dispersed through the scanning line connector, and the first nonlinear resistance circuit brings the scanning line connector to substantially the second voltage, thereby reducing a potential difference from the plural scanning lines and turning off the first nonlinear element.

2. The active matrix display device according to claim 1, wherein:

each of the switching elements is a thin-film transistor comprising;

a drain electrode connected to an associated one of the plural signal lines, a gate electrode connected to an associated one of the plural scanning lines, and a source electrode connected to an associated one of the pixel electrodes; and the first nonlinear resistor circuit comprises;

a first nonlinear resistor including a parallel connection of a first two-terminal thin-film transistor having a gate electrode and a source electrode short-circuited with each other, and a second two-terminal thin-film transistor having a gate electrode and a drain electrode short-circuited with each other.

3. The active matrix display device according to claim 2, wherein the thin-film transistor and the first nonlinear resistor have been formed in the same manufacturing step.

4. The active matrix display device according to claim 2, wherein the first nonlinear resistor circuit comprises a second nonlinear resistor including a parallel connection of a third two-terminal thin-film transistor having a gate electrode and a source electrode short-circuited with each other and a fourth two-terminal thin-film transistor having a gate electrode and a drain electrode short-circuited with each other, and the first and second nonlinear resistors are connected to each other in series.

5. The active matrix display device according to claim 2, wherein the first nonlinear resistor circuit comprises a second nonlinear resistor including a parallel connection of a third two-terminal thin-film transistor having a gate electrode and a source electrode short-circuited with each other and a fourth two-terminal thin-film transistor having a gate electrode and a drain electrode short-circuited with each other, and the first and second nonlinear resistors are connected to each other in parallel.

6. The active matrix display device according to claim 1, further comprising a signal line connector electrically connected with the counter electrode driver and electrically connecting the signal lines to each other, and second nonlinear elements electrically interposed between the signal line connector and each of the signal lines respectively.

7. The active matrix display device according to claim 6, wherein the scanning line connector and the signal line connector are electrically connected to each other.

8. The active matrix display device according to claim 1, wherein the first nonlinear elements comprise first nonlinear switches each of which includes a parallel connection of a first two-terminal thin-film transistor element having a gate electrode and a source electrode short-circuited with each other and a second two-terminal thin-film transistor element having a gate electrode and a drain electrode short-circuited with each other.

9. The active matrix display device according to claim 8, wherein the first nonlinear elements comprises second nonlinear switches each of which includes a parallel connection of a first two-terminal thin-film transistor element having a gate electrode and a source electrode short-circuited with each other and a second two-terminal thin-film transistor element having a gate electrode and a drain electrode short-circuited with each other, and the first and second nonlinear switches are connected to each other in series.

10. The active matrix display device according to claim 8, wherein the first nonlinear elements comprises second nonlinear switches each of which includes a parallel connection of a first two-terminal thin-film transistor element having a gate electrode and a source electrode short-circuited with each other and a second two-terminal thin-film transistor element having a gate electrode and a drain electrode short-circuited with each other, and the first and second nonlinear switches are connected to each other in parallel.

11. An active matrix display device, comprising:

an array substrate containing pixel electrodes disposed, via switching elements, in the vicinity of respective crossing points of mutually crossing plural signal lines and plural scanning lines;

counter electrode opposed to the pixel electrodes;

a display panel containing a light modulating layer controlled on the basis of a potential difference between the counter-electrode and the pixel electrodes;

a video signal supply configured to apply a video signal voltage to the plural signal lines;

a scanning signal supply configured to supply a scanning signal having a first voltage configured to turn on the switching elements and a second voltage configured to turn off the switching elements to the plural scanning lines; and a counter electrode driver configured to supply a counter electrode voltage to the counter electrode; wherein the array substrate includes:

a signal line connector which electrically connects the plural signal lines mutually via a first nonlinear element and which is electrically connected to the counter electrode driver, and a first nonlinear resistance circuit configured to adjust the counter electrode voltage applied to the signal line connector substantially to a mean voltage of the video signal;

wherein, when a high voltage is applied locally to the plural signal lines, the first nonlinear element is turned on and an electric charge on the plural signal lines is thereby dispersed through the signal line connector, and the first nonlinear resistance circuit adjusts the signal line connector to the mean voltage, thereby reducing a potential difference from the plural signal lines and turning off the first nonlinear element.

12. The active matrix display device according to claim 11, wherein:

each of the switching elements is a thin-film transistor comprising;

a drain electrode connected to an associated one of the plural signal lines, a gate electrode connected to an associated one of the plural scanning lines, and a source electrode connected to an associated one of the pixel electrodes; and the first nonlinear resistor circuit comprises;

a first nonlinear resistor including a parallel connection of a first two-terminal thin film transistor having a gate electrode and a source electrode short-circuited with each other, and a second two-terminal thin film transistor having a gate electrode and a drain electrode short-circuited with each other.

13. The active matrix display device according to claim 11, wherein the first nonlinear elements comprise first nonlinear switches each of which includes a parallel connection of a first two-terminal thin-film transistor having a gate electrode and a source electrode short-circuited with each other and a second two-terminal thin-film transistor having a gate electrode and a drain electrode short-circuited with each other.

14. An active matrix display device, comprising:

an array substrate containing pixel electrodes disposed, via switching elements, in the vicinity of respective crossing points of mutually crossing plural signal lines and plural scanning lines;

a counter electrode opposed to the pixel electrodes;

a display panel containing a light modulating layer controlled on the basis of a potential difference between the counter electrode and the pixel electrodes;

a video signal supply configured to apply a video signal voltage to the signal lines;

a scanning signal supply configured to supply a scanning signal having a first voltage for turning on the switching elements and a second voltage for turning off the switching elements to the scanning lines; and a counter electrode driver configured to supply a counter electrode voltage to the counter electrode; wherein the array substrate contains:

a scanning line connector which is configured to electrically connect the scanning lines mutually via a first nonlinear element, and a signal line connector configured to electrically connect the signal lines mutually via a second nonlinear element;

wherein, the scanning line connector is electrically connected to the scanning signal supply and set to the second voltage, when a high voltage is applied locally to the plural scanning lines, the first nonlinear element is turned on and an electric charge on the plural scanning lines is thereby dispersed through the scanning line connector, when a high voltage is applied locally to the plural signal lines, the second nonlinear element is turned on and an electric charge on the plural signal lines is thereby dispersed by the signal line connector, and the scanning line connector being set to the second voltage reducing thereby a potential difference from the plural scanning lines and turning off the first nonlinear element.

15. An active matrix display device, comprising:

an array substrate containing pixel electrodes disposed, via switching elements, in the vicinity of respective crossing points of mutually crossing plural signal lines and plural scanning lines;

a counter electrode opposed to the pixel electrodes;

a display panel containing a light modulating layer controlled on the basis of a potential difference between the counter electrode and the pixel electrodes;

a video signal supply configured to apply a video signal voltage to the signal lines;

a scanning signal supply configured to supply a scanning signal having a first voltage configured to turn on the switching elements and a second voltage configured to turn off the switching elements to the plural scanning lines; and a counter electrode driver configured to supply a counter electrode voltage to the counter electrode; wherein the array substrate contains:

a scanning line connector configured to electrically connect the plural scanning lines mutually via a first nonlinear element, and a signal line connector configured to electrically connect the signal lines mutually via a second nonlinear element;

wherein, the signal line connector is electrically connected to the video signal supply and set to the video signal voltage, when a high voltage is applied locally to the plural scanning lines, the first nonlinear element is turned on and an electric charge on the plural scanning lines is thereby dispersed through the scanning line connector, when a high voltage is applied locally to the plural signal lines, the second nonlinear element is turned on and an electric charge on the plural signal lines is thereby dispersed through the signal line connector, and the signal line connector being set to the mean voltage reducing thereby a potential difference from the plural signal lines and turning off the second nonlinear element.

16. The active matrix display device according to claim 15, wherein the first nonlinear elements and the nonlinear resistor are disposed on the array substrate.

17. An active matrix display device, comprising:
an array substrate containing pixel electrodes disposed, via switching elements, in the vicinity of respective crossing points of mutually crossing plural signal lines and plural scanning lines;
a counter electrode opposed to the pixel electrodes;
a display panel containing a light modulating layer controlled on the basis of a potential difference between the counter electrode and the pixel electrodes;
a video signal supply means for applying a video signal voltage to the plural signal lines;
scanning signal supply configured to supply a scanning signal having a first voltage configured to turn on the switching elements and a second voltage configured to turn off the switching elements to the plural scanning lines; and
counter electrode driver configured to supply a counter electrode voltage to the counter electrode; wherein the array substrate contains:
- a scanning line connector configured to electrically connect the plural scanning lines mutually via a first nonlinear element, and
- a signal line connector configured to electrically connect the plural signal lines mutually via a second nonlinear element and which is electrically connected to the scanning line connector;

wherein,
the scanning line connector and the signal line connector are electrically connected to the counter electrode driver and have a first nonlinear resistance circuit configured to adjust the counter electrode voltage applied to the scanning line connector substantially to the second voltage,
when a high voltage is applied to the plural scanning lines, the first nonlinear element is turned on and an electric charge on the plural canning lines is thereby dispersed through the scanning line connector,
when another high voltage is applied to the plural signal lines, the second nonlinear element is turned on and an electric charge on the plural signal lines is thereby dispersed through the signal line connector, and
the first nonlinear resistance circuit adjusting the scanning line connector to the second voltage reducing thereby a potential difference from the plural scanning lines and turning off the first nonlinear element.

18. The active matrix display device according to claim 17, wherein the first nonlinear elements and the nonlinear resistor are disposed on the array substrate.

* * * * *